United States Patent [19]

Plasencia

[11] Patent Number: 4,652,331

[45] Date of Patent: Mar. 24, 1987

[54] TAPE APPLICATOR

[75] Inventor: Richard Plasencia, Talcott, W. Va.

[73] Assignee: Trinity Development Corporation, Alderson, W. Va.

[21] Appl. No.: 827,563

[22] Filed: Feb. 10, 1986

[51] Int. Cl.⁴ .......................... B32B 31/00; B44C 7/04

[52] U.S. Cl. .................................... 156/526; 156/574; 156/575; 156/577; 156/578; 156/579

[58] Field of Search ............... 156/526, 574, 575, 577, 156/578, 579, 523, 524, 510

[56] References Cited

U.S. PATENT DOCUMENTS

| | | | |
|---|---|---|---|
| 3,116,195 | 12/1963 | Lathrop et al. | 156/575 |
| 3,260,638 | 7/1966 | Hoveland | 156/526 |
| 4,003,781 | 1/1977 | Holsten | 156/526 |
| 4,090,914 | 5/1978 | Hauk et al. | 156/523 |
| 4,196,028 | 4/1980 | Mills et al. | 156/71 |
| 4,358,337 | 11/1982 | Johnson et al. | 156/526 |
| 4,452,663 | 6/1984 | Heaton | 156/575 |

FOREIGN PATENT DOCUMENTS

| | | | |
|---|---|---|---|
| 733748 | 4/1943 | Fed. Rep. of Germany | 156/526 |

*Primary Examiner*—Caleb Weston

*Attorney, Agent, or Firm*—Seidel, Gonda, Goldhammer & Abbott

[57] ABSTRACT

A tape and adhesive applicator for dry wall taping has an adhesive dispensing nozzle adapted to be mounted on a caulking gun and an applicator roll mounted adjacent the outlet of the nozzle. The nozzle has an opening adjacent its inlet for receiving a tape for passage through the nozzle from the opening to the nozzle outlet whereby adhesive is apply to one side of the tape. The nozzle has a spring-biased adjustable gate member to control application of the adhesive and to act as a pressure relief valve if the pressure in the caulking gun becomes too great. A plunger-actuated cutter is provided to cut the tape to the proper length. The diameter of the applicator roll and length of the plunger are chosen such that the tape is coated with a uniform amount of adhesive and is automatically cut to the correct length without the need for measuring the tape.

26 Claims, 8 Drawing Figures

FIG. 5
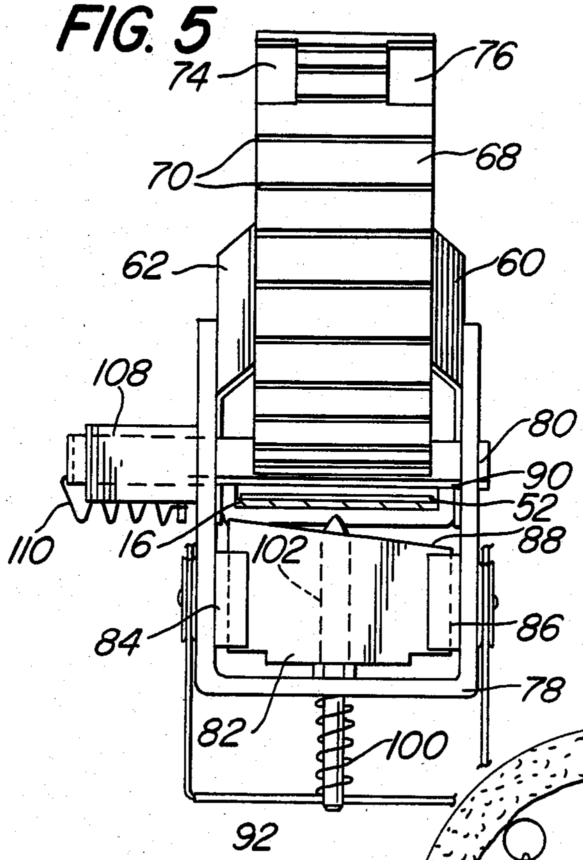
FIG. 6
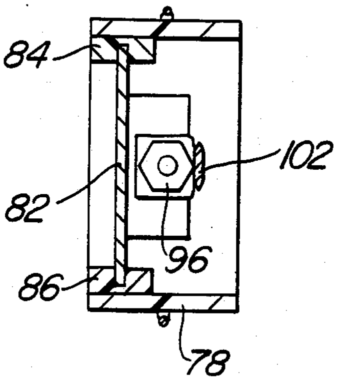
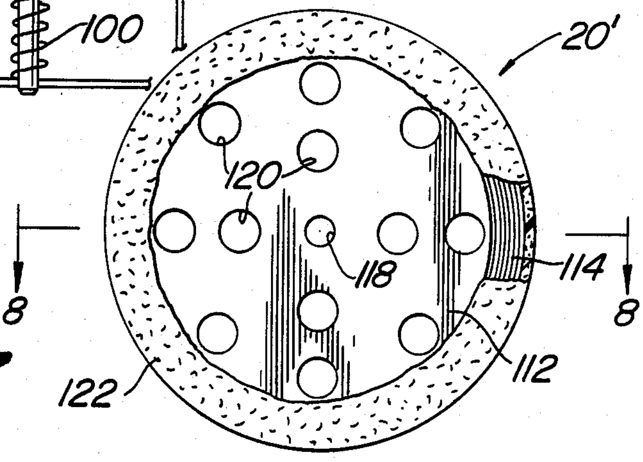
FIG. 7
FIG. 8
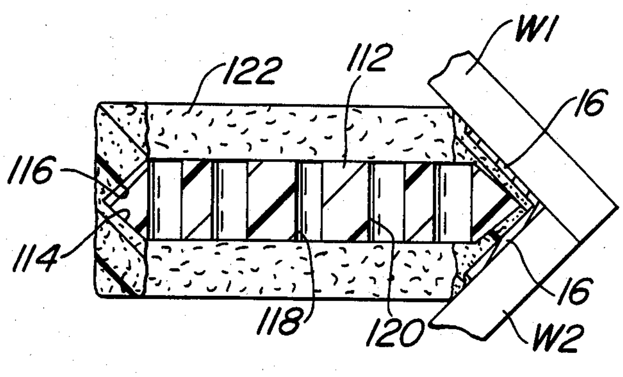

TAPE APPLICATOR

BACKGROUND OF THE INVENTION

The invention relates to a tape applicator for drywall taping.

Tape applicators and taping tools are known per se. For example, U.S. Pat. No. 4,358,337 discloses a tape applicator and mastic dispenser adapted to be mounted on a caulking gun which accepts replaceable cartridges. This type of caulking gun is the typical "do-it-yourself" caulking gun commonly available in hardware stores. Tape from a supply roll is guided past a mastic discharge opening located above a roller whereby mastic is applied to one side of the tape. The mastic-coated tape is pressed against the wall by the roller. A cut off mechanism is provided to cut the tape.

Known tape and mastic applicators have a number of drawbacks. For example, in the apparatus disclosed in U.S. Pat. No. 4,358,337, there is no way of controlling the flow of mastic through the discharge opening. There is no way of easily determining when more mastic should be dispensed from the caulking gun so that an even flow of mastic to the tape is assured. Most importantly, there is no way of automatically cutting the tape to the exact length required to yield a neat finish. With known tape applicators, the user must guess at where to cut the tape. Usually, the tape is cut either too short or too long. In each case, a hand-finishing step is necessary to provide a neat joint.

It is an object of the invention to provide a tape applicator which eliminates these problems.

Other objects and advantages of the invention will become apparent hereinafter.

SUMMARY OF THE INVENTION

The present invention is a tape and adhesive applicator comprising a dispensing means for dispensing controllable amounts of adhesive through a discharge opening. The applicator has a support means for supporting a roll of tape on the dispensing means. The tape has a first side and a second side. The applicator has a generally elongated nozzle means having an inlet end and an outlet end. The nozzle is operatively connected at its inlet end to the discharge opening of the dispensing means, for applying adhesive to one side of the tape. An opening in a wall of the nozzle means is provided adjacent the inlet end for receiving the tape for passage through the nozzle means from the opening to the outlet end whereby adhesive is applied to a first side of the tape. A gate means is disposed interiorly of the nozzle adjacent the outlet end for selectably controlling the amount of adhesive applied to the first side of the tape. A roller means is disposed adjacent the outlet end of the nozzle means for receiving adhesive-bearing tape as it exits the outlet end of the nozzle means and for advancing the tape by pressing the first side of the tape to a dry wall joint. A cutter means is disposed exteriorly of the nozzle means between the outlet end and the roller means for automatically cutting the tape to a desired length when the desired length of the tape has been advanced.

DESCRIPTION OF THE DRAWINGS

For the purpose of illustrating the invention, there is show in the drawings a form which is presently preferred; it being understood, however, that this invention is not limited to the precise arrangements and instrumentalities shown.

FIG. 5 is an end view of the tape and adhesive applicator.

FIG. 6 is a sectional view taken along the lines 6—6 in FIG. 2.

FIG. 7 is a side elevation view of a corner roller for use in the present invention.

FIG. 8 is a sectional view of the corner roller taken along the lines 8—8 in FIG. 7.

DESCRIPTION OF THE PREFERRED EMBODIMENT

Figure 1:
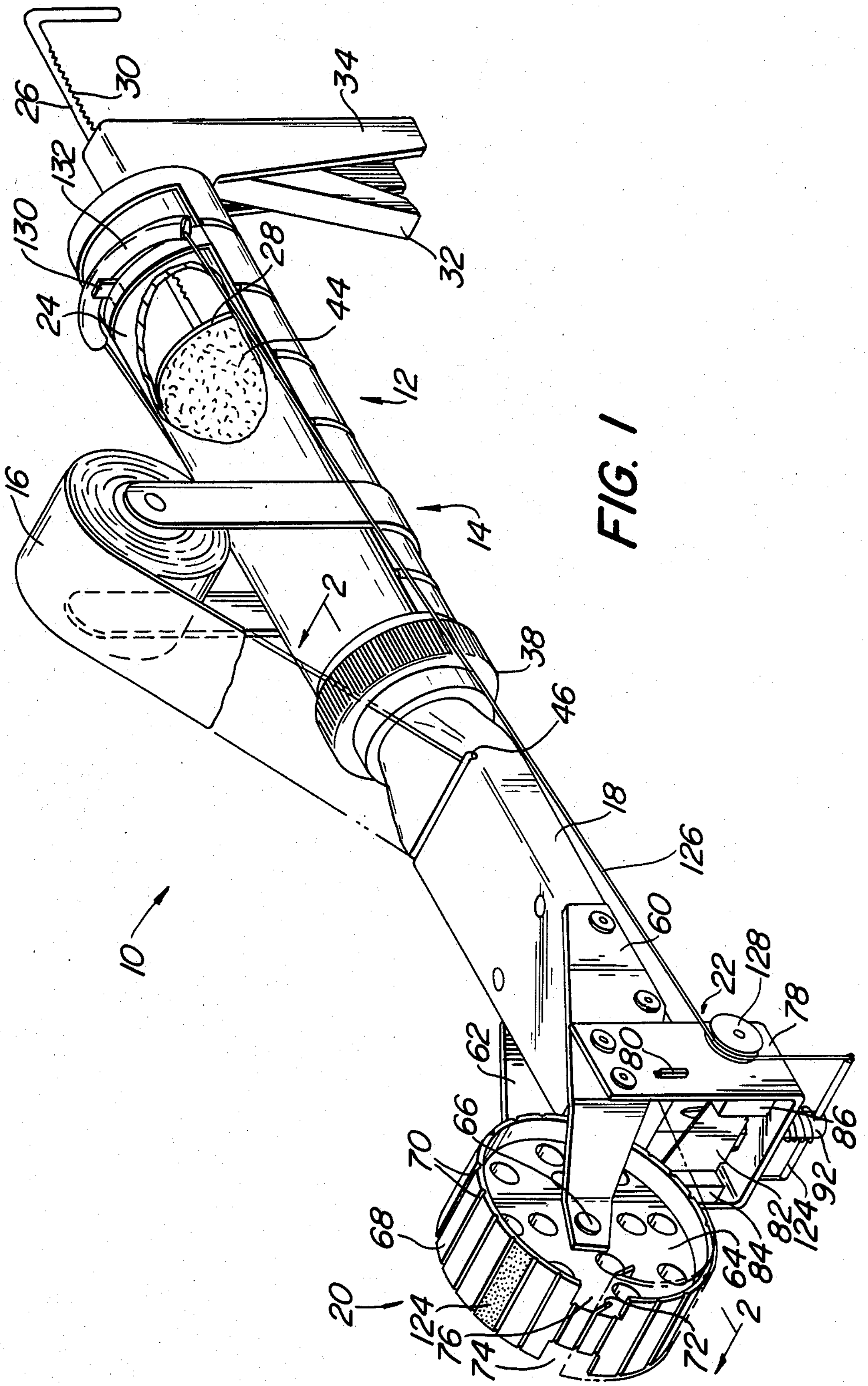
FIG. 1 is a perspective view of a tape and adhesive applicator in accordance with the present invention.

Referring now to the drawings, wherein like numerals indicate like elements, there is shown in FIG. 1 a tape and adhesive applicator 10 in accordance with the present invention. The applicator 10 comprises a dispensing means 12 for dispensing controllable amounts of adhesive, a support means 14 for supporting a roll of tape 16, a generally-elongated nozzle means 18 for applying adhesive to one side of the tape, roller means 20 for advancing the tape 16 and cutter means 22 for automatically cutting the tape 16 to a desired length when the desired length of the tape has been advanced. Support means 14 may have any configuration convenient for supporting a roll of tape, and may be attached to dispensing means 12 in any convenient manner.

Tape 16 may be either paper tape or "ready-stick" fiberglass tape which has adhesive already applied to it. The invention will be described with reference to paper tape, to which application of adhesive is necessary. Of course, as those skilled in the art will recognize, when "ready-stick" fiberglass tape is used, it is unnecessary to apply adhesive to the tape by dispensing means 12. However, the remainder of the invention applies equally to both paper and "ready-stick" fiberglass tape.

Dispensing means 12 is well known in the art and, accordingly, need only be described briefly. Dispensing means 12 has a cylindrical body 24 for holding a supply of adhesive to be dispensed. A piston rod 26 holds a piston 28 which is used to push the adhesive out of body 24 and into the nozzle means 18, as will be described in greater detail below. Piston rod 28 has ratchet teeth 30 and a trigger 32 pivoted to handle 34 to advance the piston rod 26 and thus dispense adhesive as the trigger 32 is actuated. Handle 34 enables a user to hold and use the device with one hand.

Figure 2:
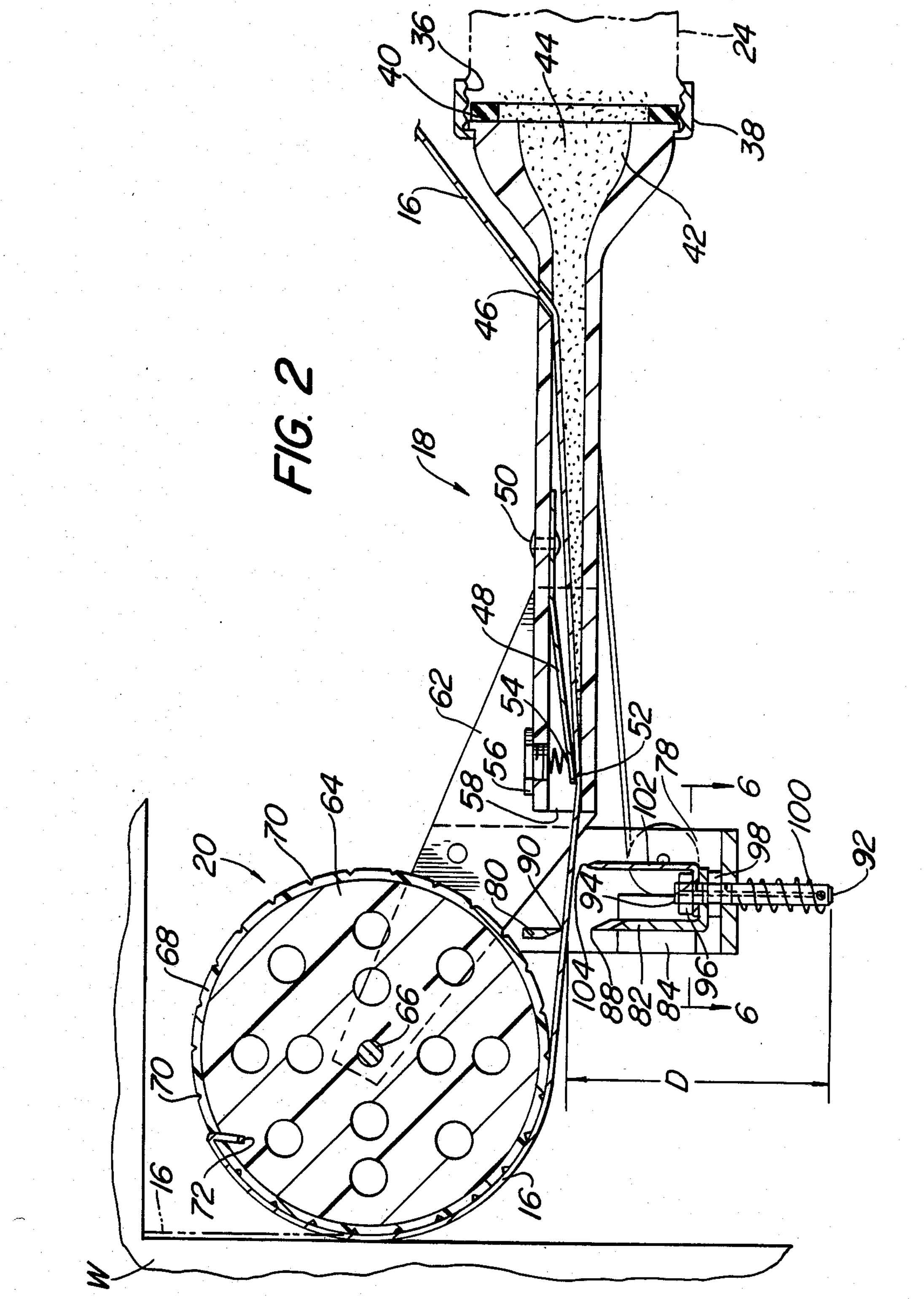
FIG. 2 is a sectional view of a portion of the tape and adhesive applicator shown in FIG. 1, taken along the lines 2—2 in FIG. 1.
Figure 3:
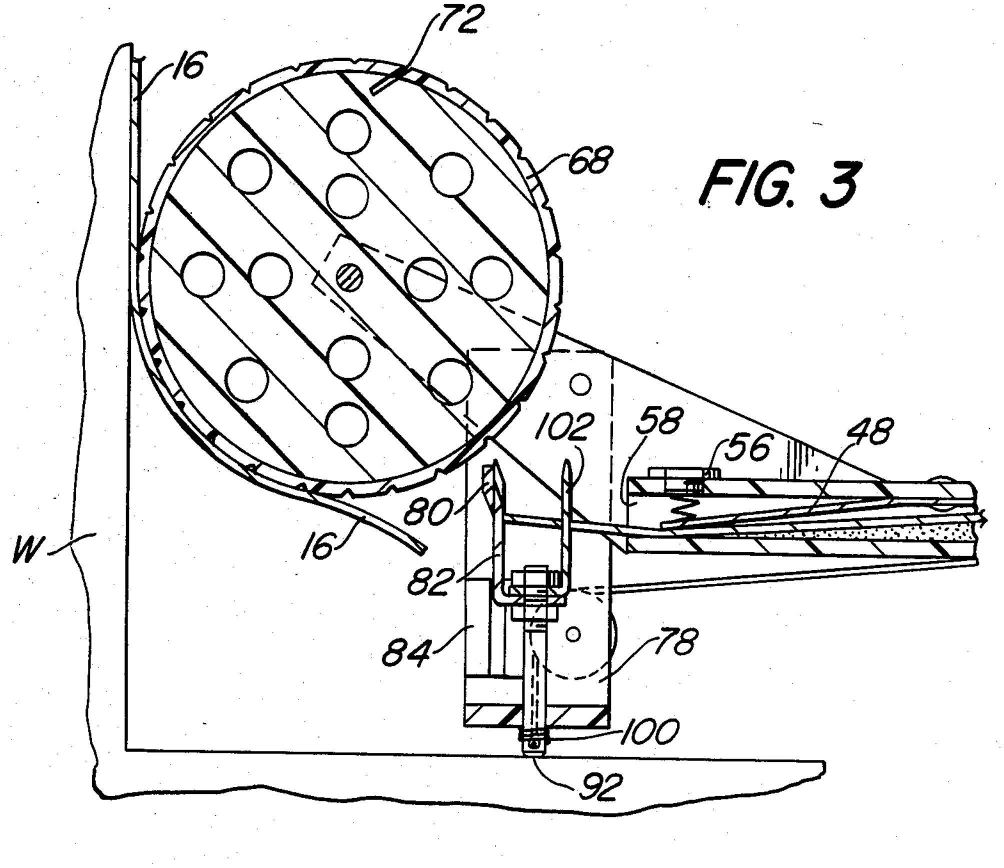
FIG. 3 is a sectional view of the tape and adhesive applicator taken along the lines 2—2 in FIG. 1 and showing the tape applicator in position for automatically cutting tape.

Referring now to FIG. 2, body 24 of dispensing means 12 terminates in a discharge opening (unnumbered), which is encircled by an externally threaded portion 36. Externally threaded portion 36 cooperates with internally threaded collar 38 rotatably mounted on nozzle means 18 to removably attach nozzle means 18 to dispensing means 12. An internal sealing ring 40 is provided inside collar 38 to seal against leakage of adhesive between externally threaded portion 36 and collar 38.

Nozzle means 18 has an inlet end 42 adjacent collar 40 so that the interior of cylindrical body 24 of dispensing means 12 is in communication with the interior of nozzle means 18. Thus, adhesive 44 (indicated by the stippling in FIG. 2) is dispensed from dispensing means 12 into nozzle means 18. Nozzle means 18 has an opening 46 in its top wall. As best seen in FIG. 1, opening 46 is in the form of a transverse slit. Tape 16 passess through opening 46 to the interior of nozzle means 18 such that one side of tape 16 contacts adhesive 44. Tape 16 may be either paper tape or "ready-stick" fiberglass tape. As noted above, when "ready-stick" fiberglass tape is used, it is unnecessary to apply adhesive to the tape by dispensing means 12 and nozzle means 18.

The amount of adhesive applied to tape 16 is controlled by gate means disposed interiorly of nozzle means 18. The gate means comprises a transverse resilient member 48 mounted to the top wall of the nozzle means, for example by rivet 50. Transverse resilient member 48 is angled downwardly from the top wall to the bottom wall of the nozzle means so as to form a narrow opening between its free end 52 and the bottom wall of nozzle means 18. Free end 52 of member 48 is biased downwardly by coil spring 54, which is seated in adjustable nut 56 threadedly engaged with the top wall of nozzle means 18. The force exerted by coil spring 54 on free end 52 can be adjusted by rotating nut 56 clockwise (for greater force) or counter-clockwise (for less force). By adjusting the amount of force applied by coil spring 54, the amount of adhesive 44 applied to tape 16 can be controlled. Spring 54 also serves as a safety pressure-release mechanism. If, for some reason, too much adhesive 44 is dispensed into nozzle means 18, the pressure of the adhesive will deflect transverse resilient member 48 upwardly, compressing spring 54 and permitting the excess adhesive to flow out the outlet end 58 of nozzle means 18.

After one side of tape 16 is coated with adhesive, tape 16 exits the outlet end of nozzle means 18 and passess around a portion of the circumference of roller means 20, which is mounted on the nozzle means adjacent its outlet end 58 by struts 60 and 62. Struts 60 and 62 may be mounted on nozzle means 18 by any suitable means, such as by riveting. Roller means 20 comprises an inner wheel 64 journaled for rotation between struts 60 and 62 by axle 66. An outer traction surface 68 is attached to the circumference of inner wheel 64. Traction surface 68 has a plurality of transverse grooves 70 to provide firm traction between tape 16 and the dry wall being taped. An angled slot 72 is provided through traction surface 68 and inner wheel 64 for receiving an end of the tape at the start of each taping operation. Traction surface 68 has symmetrical cut out portions 74 and 76 to facilitate inserting the end of the tape into slot 72.

Cutter means 22 is mounted on struts 60 and 62 adjacent the outlet end 58 of nozzle means 18 and adjacent roller means 20. Cutter means 22 comprises a generally U-shaped frame 78 mounted at the open end of the U to struts 60 and 62, for example by riveting. Cutter means 22 comprises a stationary blade 80 and a reciprocable blade 82 which is movable toward and away from stationary blade 80. Reciprocable blade 82 moves in and is constrained by guide blocks 84 and 86. The cutting edge 88 of reciprocable blade 82 is angled with respect to stationary blade 80 in the familiar guillotine shape. The cutting edge 90 of stationary blade 80 is beveled but is otherwise straight. This provides a scissors-type cutting action between cutting edges 88 and 90 so that the tape is cut cleanly, without leaving a ragged edge.

Reciprocable blade 82 is actuated by a plunger 92 which is reciprocably movable in an opening (unnumbered) at the bottom U-shaped frame 78. Reciprocable blade 82 may be attached to plunger 92 by any suitable method. As shown in FIGS. 2 and 6, plunger 92 has a threaded end 94 to which reciprocable blade 82 is attached by nuts 96 and 98. However, any other suitable attachment method, such as welding, or forming reciprocable blade 82 integrally with plunger 92, may be employed without departing from the scope of the invention.

Reciprocable blade and plunger 92 are biased to the non-cutting position by coil spring 100. A force supplied axially to plunger 92 will compress spring 100 and move reciprocable blade 82 into cutting engagement with stationary blade 80. After the cutting operation is complete, and the force removed, coil spring 100 will expand, returning reciprocable blade 82 and plunger 92 to the non-cutting position.

Cutter means 22 may also be provided with a secondary dagger-shaped blade 102 located between reciprocable blade 82 and nozzle outlet 58. Dagger-shaped blade 102 is preferrably slightly longer than reciprocable blade 82, so that during a cutting operation the tip 104 of dagger-shaped blade 102 will contact tape 16 just prior to the cutting edge 88 of reciprocable blade 82. As the cutting operation proceeds, dagger-shaped blade 102 will pierce tape 16 and will prevent tape 16 from being withdrawn into nozzle means 18 by the surface tension of adhesive 44. Thus, the free end of tape 16 will always be readily available for a subsequent taping operation. Dagger-shaped blade 102 may be mounted to plunger 92 in the same manner as reciprocable blade 82. (See FIG. 6).

Figure 4:
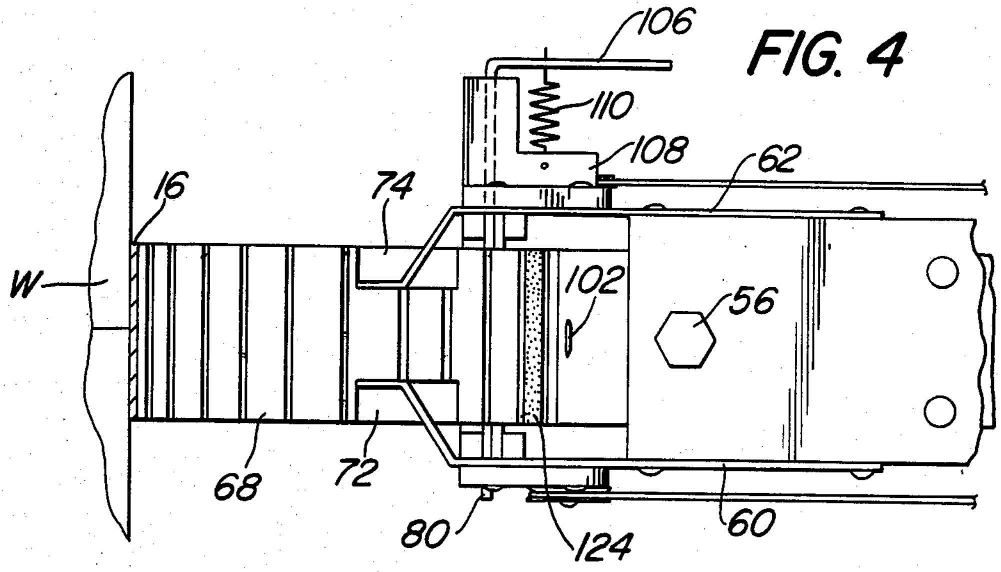
FIG. 4 is a top plan view of a portion of the tape and adhesive applicator.

As best seen in FIGS. 4 and 5, stationary blade 80 may be withdrawn from U-shaped frame 78 for cleaning the tape applicator. For this purpose, stationary blade 80 is mounted in a guide block 108 and provided with a handle portion 106. Handle portion 106 is connected to guide block 108 by coil spring 110. Stationary blade 80 may be withdrawn through guide block 108 by pulling handle 106 against the force of spring 110. With stationary blade 80 withdrawn, easy access is provided to reciprocable blade 82 and the outlet end 58 of nozzle means 18 for cleaning. Spring 110 serves to return stationary blade 80 to its normal position after cleaning.

Roller means 20 has been described with reference to a form suitable for taping flat joints, such as the joint between two adjacent pieces of drywall which are disposed in the same plane. The tape applicator of the present invention may also be used to tape corner seams. A form of roller means 20′ suitable for corner taping is shown in FIGS. 7 and 8. Roller means 20′ comprises a generally cylindrical wheel 112 having converging beveled walls 114 and 116 around its circumference to form a V-shaped contact surface. Wheel 112 has a central opening 118 for mounting on axle 66. A number of additional openings 120 can be provided in the body of wheel 112 to minimize the weight of wheel 112. A resilient band 122 is provided around the circumference of wheel 112. Resilient band 122 may be a spongy material such as natural sponge, cellular foam or the like. Resilient band 122 serves to prevent slipping of the roller means 20′ and to adjust for inevitable differences in contour which occur along an inside corner. As shown in FIG. 8, resilient band 122 will compress as required to conform to the contours of the inside corner formed between two pieces of drywall W1 and W2 being taped. This enables roller means 20' to apply a substantially uniform force to tape 16 along the entire length of the corner being taped.

The use and operation of the tape applicator will now be described with reference to paper tape. As noted, application of adhesive is not required if "ready-stick" fiberglass tape is used.

A roll of tape 16 is placed in support means 14, and the free end of tape 16 is inserted into opening 46 and threaded under transverse resilient member 48 of the gate means until the free end of tape 16 passes through outlet 58 of nozzle means 18. To facilitate the threading of tape 16 through the gate means, the adjustment nut 56 may be backed out. The free end of tape 16 is then threaded between stationary blade 80 and reciprocable blade 82 and around the circumference of traction surface 68 on roller means 20. The free end of tape 16 is then folded over and inserted into slot 72 through traction surface 68 and inner wheel 66. Adhesive 44 is then loaded into body 24 of dispensing means 12 in known manner.

As tape 16 passes through nozzle means 18 from opening 46 to outlet 58, it will be coated with adhesive. Thus, the tape is ready now to apply to a drywall joint. At this point, the adhesive-coated side of tape 16 is brought into contact with the wall W to be taped. See FIG. 2. The free end of tape 16 which has been held in slot 72 is removed automatically from roller means 20 by "back tacking". Thereafter, roller means 20 is simply rolled along wall W from top to bottom. As roller means 20 turns, traction surface 68 continues to pull tape 16 from the support means through the nozzle means.

When the bottom of the wall is reached, the automatic cutting operation can be performed. All that is necessary to automatically cut the tape to the proper length is to push the applicator downwardly so that the free end of plunger 92 touches the floor, and to continue to press the tape applicator downwardly so that reciprocable blade 82 will move upwardly relative to stationary blade 80. Movement of reciprocable blade 82 relative to stationary blade 80 will cut tape 16 in a scissors-like fashion as already described.

Tape 16 may also be cut manually if desired instead of automatically. Referring again to FIG. 1, it will be seen that plunger 92 is provided at its free end with a diametric bore (unnumbered) which receives a hollow cylindrical member 124. A cord 126, (for example, nylon line) passes through cylindrical member 124 and around pulleys 128 (only one pulley is visible in FIG. 1) back toward handle 34. After cord 126 is passed through cylindrical member 124, its free ends are attached together to form a continuous closed loop. The end of the loop near the handle end is held in place by a tab 130, which may be struck from the outer wall of body 24 of dispensing means 12. A cushioning means 132 may be provided near the handle end of dispensing means 12 to cushion the fingers when the manual cutting means is operated, as will be presently described. Cushioning means 132 may be, for example, a short length of small-diameter plastic or rubber tubing. As will be understood by those skilled in the art, cutter means 22 can be manually operated by grasping the end of the loop of cord 126 near the handle end and pulling it back toward the handle. As the cord is pulled backward, it will exert a force on plunger 92 through cylindrical member 124 which will compress spring 100 and move reciprocable blade 82 into cutting engagement with stationary blade 80. Coil spring 100 will return reciprocable blade 82 to the noncutting position when the loop of cord 126 is released. Thus, tape 16 can be cut at any point by a simple manual operation. In addition, cutter means 22 can still operate to automatically cut tape 16 as previously described.

By choosing the length of plunger 92 such that the distance between the cutting edge 90 of stationary blade 80 and the free end of plunger 92 is equal to the outside diameter of roller means 20, tape 16 will be cut automatically to the exact length required. For example, by way of illustration and not by way of limitation, if the outside diameter of roller means 20 is 4 inches, and the distance D (See FIG. 2) is also made to be 4 inches, the point at which the tape is to be cut is 4 inches away from wall W and 4 inches off the floor just before the cutting action begins. Thus, once the tape is cut, the cut end of tape 16 will fit flush to the floor.

The outside diameter of roller means 20 is a function of the particular caulking gun used. As will be understood by those skilled in the art, a caulking gun advances a volume of adhesive for each increment of piston advancement which is a function of the distance of piston advancement and the inside diameter of the caulking gun. By way of illustration and not by limitation, a caulking gun with an inside diameter of 2 inches and a piston advancement of 0.375 inches will deliver a volume of adhesive equal to 1.177 inches. This volume can be determined by the well known mathematical formula for the volume of a right cylinder, $V=\frac{1}{4}\pi d^2h$. In this example, d is the inside diameter (2 inches) and h is the piston advancement (0.375 inches). Once this volume is known, the length of tape 16 to be coated with this volume of adhesive can be selected by choosing the distance between the opening 46 and the discharge end 58 of nozzle means 18. It has been determined that this distance should be 6 times the volume of adhesive delivered. Thus, in this example, the distance between the opening 46 and outlet end 58 would be $6\times1.177$, or 7.06 inches. The length of tape 16 which will be coated by this volume of adhesive has been found to be determinable by the following formula: (distance between opening 46 and outlet 58 multiplied by 0.715) plus the distance between opening 46 and outlet 58. Thus, in this example, length of tape coated with adhesive before the piston needs to be advanced is $(7.06\times0.715)+7.06$, or 12.1 inches. This number may now be used to determine the outside diameter of roller means 20. It is desired that one complete revolution of roller means 20 correspond to one increment of piston advancement in dispensing means 12. Since 12.1 inches of tape will be coated by one piston advancement, the outside diameter of the roller to the length of tape is related by the well-known formula for the circumference of a circle, $C=\pi d$. Thus, to yield a circumference of 12.1 inches, the diameter of the roller must be 12.1 inches divided by $\pi$, or 4 inches. This procedure can be used for any available caulking gun, as long as the internal diameter and the piston advancement are known.

It will be appreciated that it is now possible to indicate to the user when another increment of piston advancement is necessary to deliver another volume of adhesive. Since one increment of piston advancement is required for each revolution of roller means 20, roller means 20 can be provided with an index mark 124 (see FIGS. 1 and 4) for indicating to the user when the piston must be advanced. Thus, each time the roller means has made one revolution as indicated by index mark 124, the user simply squeezes trigger 32 to advance piston 28 and dispense the appropriate amount of adhesive.

The provision of the index mark 124 also enables the user to apply tape using the method of "back tacking". When index mark 124 is put in a vertical position and the free end of tape 16 is pulled up to it and then threaded into slot 72, the user is able to "back tack", or set tape 16 to the wall in order to prevent the tape from slipping. By using this method, it is unnecessary to hold the tape to the wall by hand at the start of the taping run. Wrapping tape 16 around roller means 20 and inserting the free end into slot 72 also increases the user's reach.

As an alternative to providing an index mark 124 on roller means 20, the roll of tape 16 can be marked to indicate when more adhesive should be advanced.

It will be appreciated that the invention provides a novel and unobvious solution to the problems associated with known tape applicators.

The present invention may be embodied in other specific forms without departing from the spirit or essential attributes thereof and, accordingly, reference should be made to the appended claims, rather than to the foregoing specification, as indicating the scope of the invention.

I claim:

1. A tape and adhesive applicator comprising (a) dispensing means for dispensing controllable amounts of adhesive through a discharge opening, (b) support means for supporting a roll of tape on the dispensing means, the tape having a first side and a second side, (c) generally elongated nozzle means having an inlet end and an outlet end, the nozzle being operatively connected at its inlet end to the discharge opening of the dispensing means, for applying adhesive to one side of the tape, (d) an opening in a wall of the nozzle means adjacent the inlet end for receiving the tape for passage through the nozzle means from the opening to the outlet end whereby adhesive is applied to a first side of the tape, (e) gate means disposed interiorly of the nozzle adjacent the outlet end for selectably controlling the amount of adhesive applied to the first side of the tape, (f) roller means disposed adjacent the outlet end of the nozzle means for receiving adhesive-bearing tape as it exits the outlet end of the nozzle means and for advancing the tape by pressing the first side of the tape to a dry wall joint, and (g) cutter means disposed exteriorly of the nozzle means between the outlet end and the roller means for automatically cutting the tape to a desired length when the desired length has been advanced.

2. A tape and adhesive applicator according to claim 1, wherein the nozzle means has a generally rectangular transverse cross-section.

3. A tape and adhesive applicator according to claim 1, wherein the gate means comprises a resilient member spring-biased against the second side of the tape.

4. A tape and adhesive applicator according to claim 1, wherein the cutter means comprises a stationary blade adjacent the second side of the tape and a movable blade adjacent the first side of the tape and arranged to move reciprocally toward and away from the stationary blade, the movable blade and stationary blade being arranged to cut the tape therebetween.

5. A tape and adhesive applicator according to claim 4, wherein the cutter means includes a projection movable with the movable blade and located between the movable blade and the nozzle means outlet end for piercing the tape and preventing retrograde movement of the tape as the tape is cut.

6. A tape and adhesive applicator according to claim 4, wherein the movable blade is actuated by a plunger having a free end adapted to be moved by pressing the free end thereof against a surface.

7. A tape and adhesive applicator according to claim 6, wherein the plunger and movable blade are spring-biased to a non-cutting position.

8. A tape and adhesive applicator according to claim 7, wherein the diameter of the roller means is equal to the distance from the cutting edge of the stationary blade and the free end of the plunger when the plunger is biased to the non-cutting position.

9. A tape and adhesive applicator according to claim 1, wherein the dispensing means comprises a body means and a piston advanceable in said body means for dispensing an amount of adhesive for an incremental advancement of the piston, and wherein the outside diameter of the roller means is a function of the volume of adhesive dispensed by said incremental advancement of the piston.

10. A tape and adhesive applicator according to claim 1, wherein the roller means has a V-shaped contact surface for creasing the tape and forcing the tape into a corner.

11. A tape and adhesive applicator according to claim 10, wherein the roller means further comprises a resilient, compressible band in circumferential contact with the V-shaped contact surface.

12. A tape and adhesive applicator according to claim 1, wherein the tape is paper tape.

13. A tape and adhesive applicator according to claim 1, wherein the tape is fiberglass tape.

14. A tape and adhesive applicator according to claim 1, further comprising means operatively associated with said cutter means for manually actuating said cutter means to manually cut the tape to a desired length.

15. A tape applicator adapted for use with a caulking gun, comprising (a) generally elongated nozzle means having an inlet end and an outlet end, the inlet end being adapted to be operatively connected to the discharge opening of the caulking gun, (b) an opening in a wall of the nozzle means adjacent the inlet end for receiving tape from a source of tape for passage through the nozzle means from the opening to the outlet end, (c) gate means disposed interiorly of the nozzle adjacent the outlet end having a resilient member spring-biased against one side of the tape, (d) roller means disposed adjacent the outlet end of the nozzle means for receiving the tape as it exits the outlet end of the nozzle means, and (e) cutter means disposed exteriorly of the nozzle means between the outlet end and the roller means for automatically cutting the tape to a desired length.

16. A tape applicator according to claim 15 wherein the nozzle means has a generally rectangular transverse cross-section.

17. A tape applicator according to claim 15, wherein the cutter means comprises a stationary blade adjacent one side of the tape and a movable blade adjacent the other side of the tape and arranged to move reciprocally toward and away from the stationary blade, the movable blade and stationary blade being arranged to cut the tape therebetween.

18. A tape applicator according to claim 17, wherein the cutter means includes a projection movable with the movable blade and located between the movable blade and the nozzle means outlet end for piercing the tape and preventing retrograde movement of the tape as the tape is cut.

19. A tape applicator according to claim 17, wherein the movable blade is actuated by a plunger having a free end adapted to be moved by pressing the free end thereof against a surface.

20. A tape applicator according to claim 19, wherein the plunger and movable blade are spring-biased to a non-cutting position.

21. A tape applicator according to claim 20, wherein the diameter of the roller means is equal to the distance from the cutting edge of the stationary blade and the free end of the plunger when the plunger is biased to the non-cutting position.

22. A tape applicator according to claim 15, wherein the roller means has a V-shaped contact surface for creasing the tape and forcing the tape into a corner.

23. A tape applicator according to claim 22, wherein the roller means further comprises a resilient, compressible band in circumferential contact with the V-shaped contact surface.

24. A tape applicator according to claim 15, wherein the tape is paper tape.

25. A tape applicator according to claim 15, wherein the tape is fiberglass tape.

26. A tape applicator according to claim 15, further comprising means operatively associated with said cutter means for manually actuating said cutter means to manually cut the tape to a desired length.

* * * * *